US008743145B1

(12) United States Patent
Price

(10) Patent No.: US 8,743,145 B1
(45) Date of Patent: Jun. 3, 2014

(54) VISUAL OVERLAY FOR AUGMENTING REALITY

(75) Inventor: Roy F. Price, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 275 days.

(21) Appl. No.: 12/869,294

(22) Filed: Aug. 26, 2010

(51) Int. Cl.
*G09G 5/00* (2006.01)
(52) U.S. Cl.
USPC .......... 345/633; 345/629; 345/630; 345/631; 345/632; 715/757
(58) Field of Classification Search
USPC ................................. 345/629–634; 715/757
See application file for complete search history.

(56) References Cited

U.S. PATENT DOCUMENTS

| | | | | |
|---|---|---|---|---|
| 7,797,168 | B2 * | 9/2010 | Kusumoto et al. ............ | 705/1.1 |
| 8,194,101 | B1 * | 6/2012 | Mann et al. .................. | 345/633 |
| 2007/0061211 | A1 * | 3/2007 | Ramer et al. .................. | 705/25 |
| 2009/0144105 | A1 * | 6/2009 | Blatchley et al. ............. | 705/7 |
| 2011/0213664 | A1 * | 9/2011 | Osterhout et al. ......... | 705/14.58 |

OTHER PUBLICATIONS

"GM Demonstrates Future Head-Up Display", Kicking Tires, Retrieved on Jun. 7, 2010 at <<http://blogs.cars.com/kickingtires/2010/03/gm-demonstrates-future-headup-display.html>>, 4 pages.
"GM Makes Your Entire Windshield a Head-Up Display", wired.com/autopia, Retrieved on Jun. 7, 2010 at <<http://www.wired.com/autopia/2010/03/gm-next-gen-heads-up-display/>>, 8 pages.
"GM Reimagines Head-Up Display Technology", GM Media—United States, Retrieved on Jun. 7, 2010 at <<http://media.gm.com/content/media/us/en/news/news_detail.brand_gm.html/content/Pages/news/us/en/2010/Mar/0317_hud>>, 2 pages.

* cited by examiner

*Primary Examiner* — Xiao Wu
*Assistant Examiner* — Todd Buttram
(74) *Attorney, Agent, or Firm* — Lee & Hayes, PLLC

(57) ABSTRACT

Augmented reality may be provided to one or more users in a real-world environment. For instance, information related to a recognized object may be displayed as a visual overlay appearing to be in the vicinity of the object in the real-world environment that the user is currently viewing. The information displayed may be determined based on at least one of captured images and transmissions from other devices. In one example, a portable apparatus receives a transmitted user ID and may submit the user ID to a remote computing device that compares a profile of a user corresponding to the user ID with a profile associated with the portable apparatus for determining, at least in part, information to be displayed as the visual overlay. As another example, the portable apparatus may include a camera to capture images that are analyzed for recognizing objects and identifying other users.

31 Claims, 7 Drawing Sheets

VISUAL OVERLAY FOR AUGMENTING REALITY

BACKGROUND

Augmented reality may be generally defined as a live experience of a real-world environment whose elements are augmented by computer-generated virtual images or information. Augmented reality technology can enhance a person's perception of a current environment, such as by providing information on objects in a field of view. Consequently, augmented reality has the potential to allow the real world around a person to become digitally interactive and accessible. However, conventional augmented reality systems have yet to achieve this potential in a practical and useful manner.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
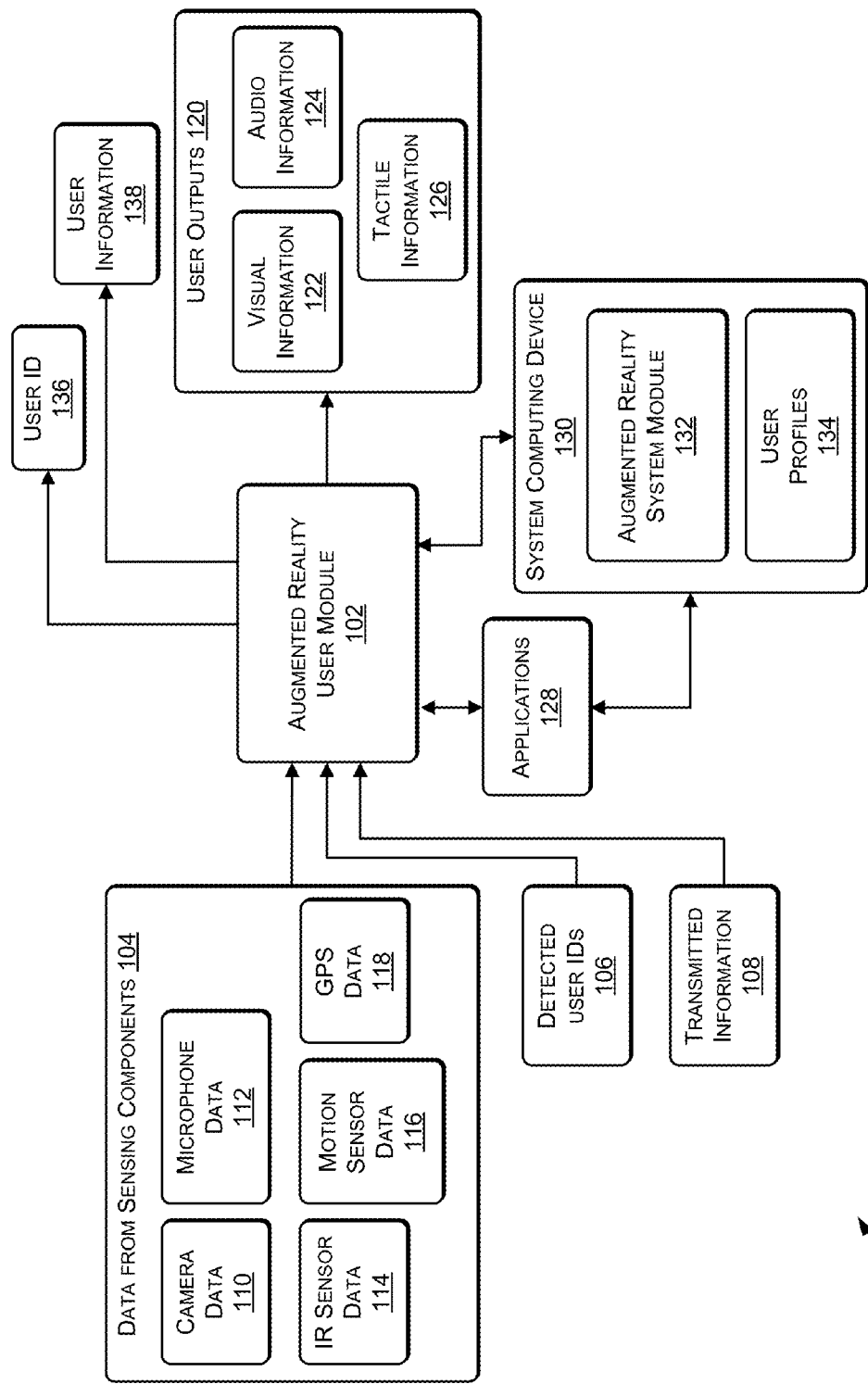
FIG. 1 illustrates a framework for providing augmented reality to a user according to some implementations.

This disclosure describes an architecture and techniques for providing augmented reality to one or more users in a real-world environment. For instance, some implementations overlay data over a user's field of vision using at least one of sensor inputs and transmissions from other devices. In one example, a user may employ a portable apparatus including a visual overlay interface that displays information and imagery, or otherwise augments reality in the vicinity of objects (e.g., people) in the user's field of vision. The portable apparatus may include an interface device for displaying processor-generated information to the user so as to appear to be inserted into or overlaid on the real-world environment that the user is currently viewing. In some implementations, the interface device may comprise eye glasses, a transparent visor, goggles, or the like, that enable the user to see his or her current surroundings, while also providing a screen or platform for display of the augmented reality information as a visual overlay for concurrent viewing by the user.

The portable apparatus may further include a transceiving device configured to communicate with at least one of: a network, transceiving devices of other users, and transceiving devices in fixed locations for determining appropriate information to be presented to the user. Accordingly, in some implementations, the portable apparatus may include a receiver, a transmitter, a processor, at least one camera or imaging device, and a visual overlay interface. For example, the transmitter may continually or periodically transmit or broadcast information, such as an identifier (ID) of the user (referred to hereafter as the user ID). The user ID may be a unique ID for identifying the user within the augmented reality system, but may otherwise enable the user to remain generally anonymous.

For instance, in some implementations, the user ID may be a random, semi-random or assigned number. In other implementations, the user ID may be an alias or user name made up by the user. Additional sensors and interfaces may also be included in the portable apparatus in some implementations. For example, the portable apparatus may include one or more microphones for collecting sound information for analysis. As another example, the portable apparatus may include infrared sensors, such as for receiving infrared signals from other apparatuses and/or for providing augmented vision to a user.

In some implementations, the portable apparatus may participate in an augmented reality system that may include a plurality of other portable apparatuses of other users, a plurality of other participating devices at fixed locations, and one or more system computing devices for managing and facilitating the system. The portable apparatus may obtain and interpret at least one of three types of data: raw visual images or other sensor data; transmitted user IDs of other users or other participating devices at fixed locations; and transmitted data received from other users or other participating devices at fixed locations. The portable apparatus may apply logic based on user preferences for determining how to present various types of information as an overlay to the user. Accordingly, in some implementations, the receiver, the camera and/or other sensors of the portable apparatus gather data (e.g., received user IDs and information, collected images, detected sounds, etc.) and provide this gathered data to the processor of the portable apparatus for analysis. For example, the received user IDs may be submitted to the system computing device for association with a corresponding user profile. Additionally, the processor may submit the gathered data to one or more applications executable on the portable apparatus to determine whether the applications can provide any appropriate information to be displayed to the user.

As an example, when the portable apparatus of a first user detects a user ID of a second user in a local vicinity of the first user, the portable apparatus of the first user may submit the user ID of the second user to the system computing device for identifying any permission rules or commonalities that exist between the first user and the second user. Each user may create inbound and outbound permission rules and identify appropriate data to be displayed based on matching of permission rules with other users. For instance, the permission rules may be established as part of a profile for each user maintained by the system computing device. As one example, if the first user is a fan of a particular sports team, and the second user is also a fan of the same sports team, the permission rules for the second user might indicate that the particular sports team's name or logo is to be displayed adjacent to the second user by the first user's portable apparatus. Consequently, the system computing device can inform the portable apparatus of the first user that the particular sports team's name or logo is to be displayed adjacent to the second user in the visual overlay displayed first user.

Additionally, in some implementations, one or more cameras may be included in the portable apparatus, such as on a head-mounted interface device. The cameras may gather data regarding the real-world environment that the user is currently viewing and may submit images to the processor of the portable apparatus, such as for shape recognition, facial recognition, motion detection, and the like. For example, the processor may provide the collected images to one or more applications to determine whether any of the applications can present data triggered by the appearance or identification of specific objects. To provide a few examples, when the user is looking at the night sky, a first application may identify the names of constellations and overlay the names of the constellations adjacent to the corresponding stars in the user's field of view; when the user is in a store, another application may obtain and display a price of an item when the user looks at a bar code on the item; when the user is sightseeing, yet another application may identify popular landmarks and provide information about the landmarks as an overlay when the user is looking at the landmarks.

Additionally, the user may specify when particular applications are active based on particular times, locations, contexts, preferences, priorities and the like. For example, during work hours a user may have a first set of applications that are active, while after work hours, on vacation, etc., the user may specify that a different set of applications are active. Similarly, the user may also specify information to be displayed adjacent to the user by other users' devices based on particular times, locations, contexts, preferences, priorities, and the like. For example, at a conference or seminar, the user may specify that his or her name and company be displayed to other participants of the conference or seminar. When the user is at a sporting event, meanwhile, the user may specify that his or her team affiliation is to be displayed to all users, while his or her name might only be displayed to friends or friends of friends.

The image data collected by the cameras may also be used to correctly associate data with particular shapes or people in the user's field of vision using shape recognition, facial recognition, text recognition, or the like. For example, in the case in which several people in the user's field of vision are broadcasting their user IDs, the portable apparatus can match data with particular people by obtaining one or more images of each of the people from the system computing device based on the received user IDs. The processor can then compare the images obtained by the cameras with the one or more images obtained from the system computing device and thereby correctly match the information to be displayed adjacent to the each person. Particular shapes, landmarks and the like may be similarly matched using shape recognition.

According to some implementations, data to be displayed may also be matched to an object in the field of vision based on a transmission signal received from the object. For example, various techniques, such as measuring relative signal strengths received from multiple sources, measuring signals delivered to multiple antennas, etc., may be employed to determine the direction and proximity of the source and thereby deduce which augmented reality information is to be associated with which object in the field of view. For instance, if the user is receiving two signals from two other users, one who is close by one who is further away, and one of the received signals is detected to be stronger than the other received signal, then this provides an indication that the user ID associated with the strongest signal may be attributed to the closer of the two users. Further, signal strength may only be one factor considered from among a number of factors such as facial recognition, transmitted information, and the like, when distinguishing between two or more users. For example, an apparatus can transmit Global Positioning System (GPS) information to other apparatus, which can compare this GPS information with their own GPS information when attempting to recognize a particular user from among multiple users or other objects.

As described above, and as described additionally below, implementations herein may be configured to collect data from transmitters, cameras, and other sensors, and analyze the collected data using one or more applications. Some implementations also provide for accessing a remote system computing device to obtain augmented reality information to be displayed in relation to particular users based on the user IDs obtained from the particular users. The available information may be filtered based on user preferences and priorities for presentation as a real-time augmented reality overlay to the user. Further in some implementation, in addition to a visual overlay, the portable apparatus may also provide audio information and/or tactile information to the user.

The techniques described above and below may be implemented in a number of ways and in a number of different contexts. Several example implementations and contexts are provided with reference to the following figures. However, the following example implementations and contexts are but a few of many that will be apparent to those of skill in the art in view of the disclosure herein.

Example Framework

FIG. 1 is a block diagram illustrating an example of a framework 100 for providing augmented reality according to some implementations. Framework 100 includes an augmented reality (AR) user module 102 that is executable to present the augmented reality to a user. AR user module 102 may receive one or more types of inputs, such as data received from sensing components 104, detected user IDs 106 and/or transmitted information 108. Sensing component inputs may include data collected from a variety of detection and sensor devices, such as camera data 110, microphone data 112, infrared (IR) sensor data 114, motion sensor data 116 and/or GPS data 118.

In addition to receiving the data from sensing components 104, AR user module 102 may also receive detected user IDs 106 detected from other users. Detected user IDs may be detected as part of IR sensor data 114, may be detected via wireless RF signal, or by other wireless transmission. AR user module 102 may use a detected user ID 106 to attempt to determine information regarding a person within the user's field of vision. Additionally, stationary devices, such as devices maintained by businesses participating in the augmented reality framework, may also have user IDs 106 that may be received by AR user module 102 and used to obtain information on the business.

Additionally, in some implementations, AR user module 102 may also receive transmitted information 108. Thus, rather than merely receiving a user ID, the transmitted information 108 may supply specific information that can be directly presented to the user of the augmented reality user module 102. For example, in the case of a restaurant, the transmitted information 108 may be menu items currently on special to be displayed when the user looks at the restaurant sign, or the like. In the case of a retail store the transmitted information 108 may be sale items and prices to be displayed when the user looks at the retail store. In the case of another individual, the transmitted information may be information that other individual would like everyone to know, such as that the other individual is currently searching for a lost pet.

AR user module 102 performs analysis on the received inputs to provide one or more user outputs 120 to the user. The user outputs 120 may include visual information 122, audio information 124, and/or tactile information 126. For example, the visual information 122 may include an augmented reality visual overlay presented in the user's field of vision for one or more detected objects. Additionally, audio information may be presented such as information regarding one or more detected objects such as the name of a person, information on landmarks, etc. Furthermore, tactile information may also be presented to a user. The tactile information may be as simple as generating a vibration in response to a particular detected condition, or may be more complex, such as generating a Braille device message to a blind user.

In order to determine the user outputs 120, AR user module 102 may employ the assistance of one or more applications 128 and/or a system computing device 134. For example, the AR user module 102 may execute the one or more applications 128 against the data received from sensing components 104 for determining various appropriate user outputs 120. For example, applications 128 may include numerous types of applications for carrying out various recognition and identification functions and for providing information in response to recognized objects, sounds, locations, contexts, and so forth, relevant to the user's current field of view. Furthermore, in some implementations, applications 128 may also contact system computing device 130 and/or other remote sources for obtaining additional information. For example, in the case of a facial recognition application, the application may be configured to contact a system computing device 130 with a detected user ID to obtain an image of an individual corresponding to the detected user ID for carrying out a facial recognition comparison. As another example, in the case of the user looking at a movie theater, an application may obtain show times and prices for various movies playing at the theater from a website, as well as reviews of the movies. The AR user module 102 may display the show times, prices and reviews as an overlay to the user while the user is looking at the theater.

In some implementations, the AR user module may combine information that is pushed to the AR user module with information that is gathered or generated by applications 128 or other sources. For example, in the case of the movie theater, the movie theater may directly transmit the show times and prices to the AR user module. Further, the AR user module may also employ an application to obtain reviews on the movies and on the movie theater itself from other sources, such as reviews available online. This information can be combined by the AR user module and presented as a visual overlay when the user looks at the movie theater. Consequently, implementations herein are able to obtain information from multiples sources in both a push and pull fashion.

Furthermore, AR user module 102 may access system computing device 134 to obtain additional information to be provided as user outputs 120. For example, the system computing device 130 may include an augmented reality system module 132 and a plurality of user profiles 134. Thus, AR user module 102 is able to communicate with AR system module 132 by providing the detected user IDs 106 to the AR system module 132, as well as a user ID 136 corresponding to the user of the AR user module 102. The AR system module 132 matches the detected user IDs 106 with the corresponding user profiles 134, and compares the user profiles with the user profile for the user of the AR user module 102 for determining appropriate information to be provided as the user outputs 120.

For example, in a social networking implementation, the AR system module 132 may determine from the user profiles 134 that a first user using the AR user module 102 and a second user corresponding to a detected user ID 106 are friends or members of the same group in a social network. Thus, the AR system module 132 may provide the AR user module 102 with information according to one or more permissions set by the second user such as the name of the second user, current status, etc., which may be displayed as visual information adjacent to the second user in the field of view of the first user, such as when the user ID 106 of the second user is detected. Additionally, audio information and/or tactile information may also be provided to the first user, such as by stating, e.g. "John Smith, a friend of Mary Williams, is ahead on your left," or by providing a particular tactile feedback indicative of a friend or a friend of a friend being nearby.

The profile of the user may be generated when the user first starts using the framework. For example, the user may adopt default settings, or the user may fully customize the profile from the start. The profile may be configured to automatically change settings according to specified times, locations, contexts, situations, and the like. For example, when GPS data, time of day, and other sensed information indicates that the user is at work, a first set of settings and permissions may be in effect, e.g., co-workers are just able to see the user's first and last name. On the other hand, when the user is walking down the street after work hours, a different set of permissions may be in place such as that no information is typically displayed to most other users except for those whose profiles show that they are members of the same social group or network e.g., friends or friends of friends, or, for example other users who share a common interest with the user such as sailing, skiing, being fans of the same sports team, attending the same university, supporting the same charity, being members of the same church, or the like.

Additionally, the information displayed to each of these different categories of users may be different and specified by the user for the particular category. For example, fans of the same sports team might merely see the team logo displayed over the user's head, without the user's name or any other information, while members of the same church might be presented with the user's full name and the name of the church. Thus, through the user profile, the user may specifically control the information displayed to each category of a plurality of categories of other users.

Additionally, in some implementations, the user may agree to provide advertising for one or more products, such as for compensation, for receiving a free or reduced-price apparatus, reduced-price user fees, or the like. For example, a user's profile may specify that a particular advertisement is displayed adjacent to the user in addition to or instead of user specific information such as the user's name. The user may specify particular categories of people that are presented with the advertisement.

Furthermore, in some implementations, the user may also control the information about other users that is displayed to the user. For example, in the case of a child user, parental controls may be applied by the profile to prevent profanity or other inappropriate information from being displayed to the child. Numerous other variations will be apparent to those of skill in the art in view of the disclosure herein with the implementations described being mere non-limiting examples for discussion purposes.

Additionally, AR user module 102 may be configured to transmit or broadcast a user ID 136 corresponding to the user of the AR user module 102. For example, the user ID may be continually or periodically broadcast using wireless technology, such as RF transmission, infrared (IR) light, or other wireless communication. In some implementations, the user may be given the option of controlling when and where the user ID 136 is broadcast. Further, in some implementations, in addition to or instead of broadcasting a user ID, the AR user module 102 may be configured to broadcast particular user information 138. For example, in the case in which a user is at a seminar or convention, the user may authorize the AR user module 102 to broadcast the user's name, company, or other information to any other users in the vicinity. Additional variations and implementations are discussed below.

Example Portable Apparatus

Figure 2:
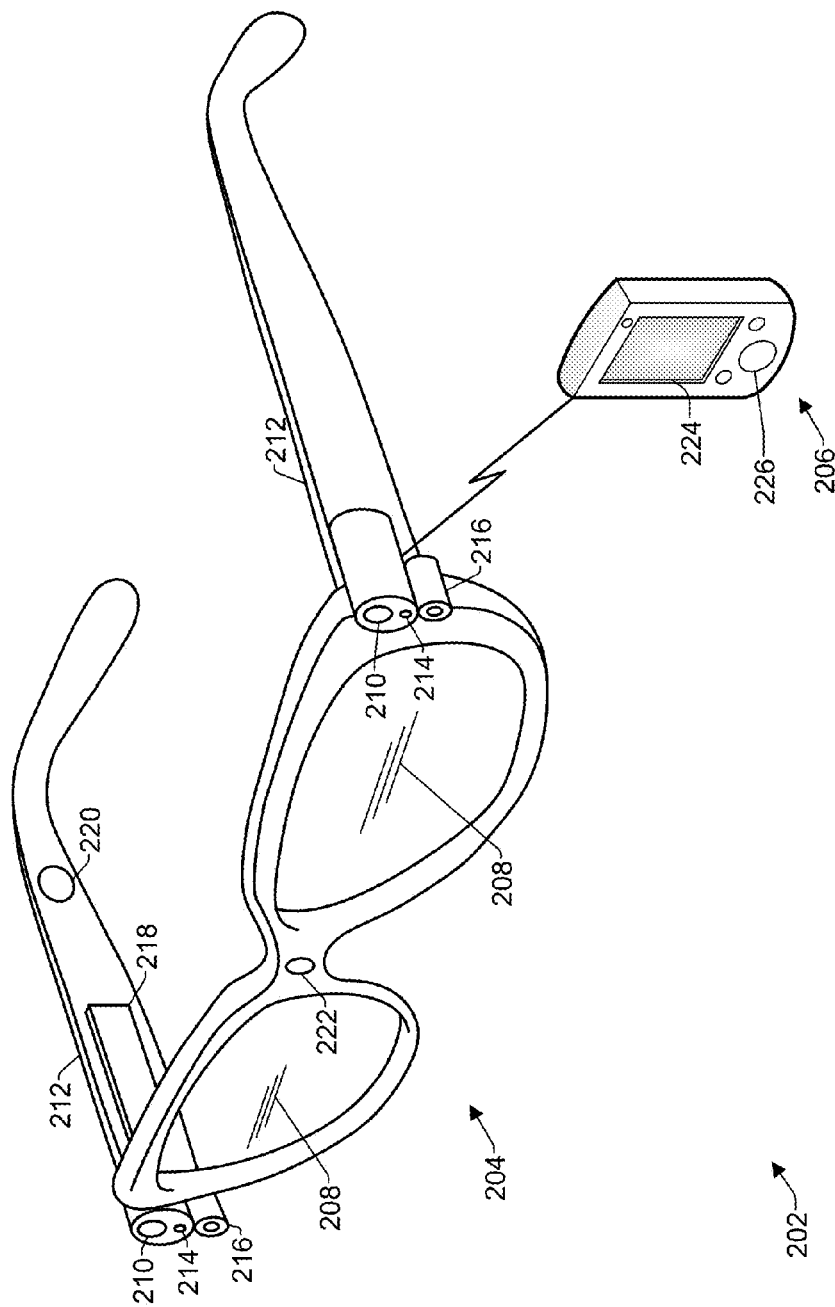
FIG. 2 illustrates an example of a portable apparatus for providing augmented reality according to some implementations.

FIG. 2 illustrates an example of a portable apparatus 202 for providing augmented reality to a user according to some implementations herein. In some implementations, the AR user module 102 described above may be executed on the portable apparatus 202. In the illustrated example, portable apparatus 202 includes an interface device 204 in operative communication with a transceiving device 206. In some implementations, interface device 204 may be a head-mounted interface configured to provide information to a user relevant to objects recognized in the user's field of vision for augmenting the user's real-world experience.

Transceiving device 206 may be configured to receive information, such as data from sensing components, detected user IDs, transmitted information, and information provided by the system computing device, as described above. Transceiving device 206 may also perform processing and analysis of the received information and determine appropriate visual, audio and tactile output to be provided by the interface device 204. According to some implementations, transceiving device 206 and interface device 204 are able to communicate wirelessly for passing information there between. For example, various wireless technologies may be used such as Bluetooth® or other communication technologies. Alternatively of course, transceiving device 206 may be in wired communication with interface device 204. Furthermore, while in this example, the interface device 204 and the transceiving device 206 of the portable apparatus 202 are shown as being separate from each other, in other implementations, the interface device 204 and the transceiving device 206 may be contained in a single unit as portable apparatus 202.

Interface device 204 may include a screen, display field, or other transparent or semi-transparent interface for displaying augmented reality to a user wearing interface device 204. In the illustrated implementation, interface device 204 is configured as a pair of eyeglasses having lenses 208 which serve as a screen for displaying an overlay of the visual augmented reality information. Thus, lenses 208 serve as a transparent or semi-transparent interface interposed between the user and an object, and upon which the augmented reality information may be overlaid to appear to be in the vicinity of the object. For example, lenses 208 may have a partially mirrored layer to enable projection of images and information on to lenses 208 so as to be viewable by a user wearing the interface device 204.

Other technologies may also be implemented for displaying the augmented reality images and information to the user, such as various active lens technologies, liquid crystal display technologies, laser projection technologies, holographic display technologies, or the like, for displaying the augmented reality images and information to the user while still permitting the user to continue to view at least a portion of the real-world environment within the user's field of vision. Furthermore, while in this example the interface device 204 is in the form of eyeglasses, in other implementations, interface device 204 may be a transparent visor, goggles, a helmet, or other apparatus able to project or display the AR information in the user's field of view. Additionally, advancements in holographic imaging may obviate the need for the lenses or screen, and may enable the overlay to be presented directly in the user's field of view. Consequently, implementations herein are not limited to the example eyeglass configuration disclosed.

Interface device 204 may include various ones of the sensing and detection components discussed above. For example, interface device 204 may include one or more cameras 210 able to receive images of whatever is currently within the view of the user. In the illustrated example, a pair of cameras 210 are mounted adjacent to temple portions 212 of the interface device 204. Thus, cameras 210 are head-mounted cameras that capture images of the user's current field of view. Further, by using a pair of cameras 210, a stereoscopic image may be generated for provided additional information during analysis of the gathered images. Additionally, interface device 204 may include one or more microphones 214, one or more infrared sensors or cameras 216, as discussed above, and various other sensors or detection devices.

Interface device 204 may also include a visual overlay component 218, which may be mounted on the interior side of one or both of the temple portions 212 for displaying an augmented reality visual overlay on the lenses 208, as discussed above. Additionally, one or more speakers 220 may be mounted on temple portions 212 for providing audio information to the wearer of the interface device 204. Further one or more infrared emitters 222 may be provided, such as for broadcasting a user ID and/or for detecting objects in low light situations. Interface device 204 may include various additional components not shown in FIG. 2, such as communication components for enabling exchange of information with the transceiving device 206, and one or more power sources for supplying power to the interface device 204.

In some implementations, transceiving device 206 may be a portable computing device having wireless communication capability, such as a smart phone, PDA, tablet computing device or other mobile computing device. For example, transceiving device 206 may include a display screen 224 and various controls 226 for enabling a user to interact with the AR user module 102. Display 224 may be passive, emissive or any other form of display. In some implementations, the display 224 may be embodied using various display technologies, such as LCDs (liquid crystal displays) or OLEDs (organic light emitting diodes), or variations thereof. Additionally, a touch sensitive mechanism may be included with the display 224 to form a touch-screen display. A user may use the display 224 and/or controls 226 for setting or changing profile configurations and preferences, specifying information to be broadcast within the augmented reality system, and the like. Further, in other implementations, rather than being a general purpose smart phone or mobile computing device, transceiving device 206 may be a dedicated computing device specifically configured for interacting within the AR framework and system described herein.

Figure 3:
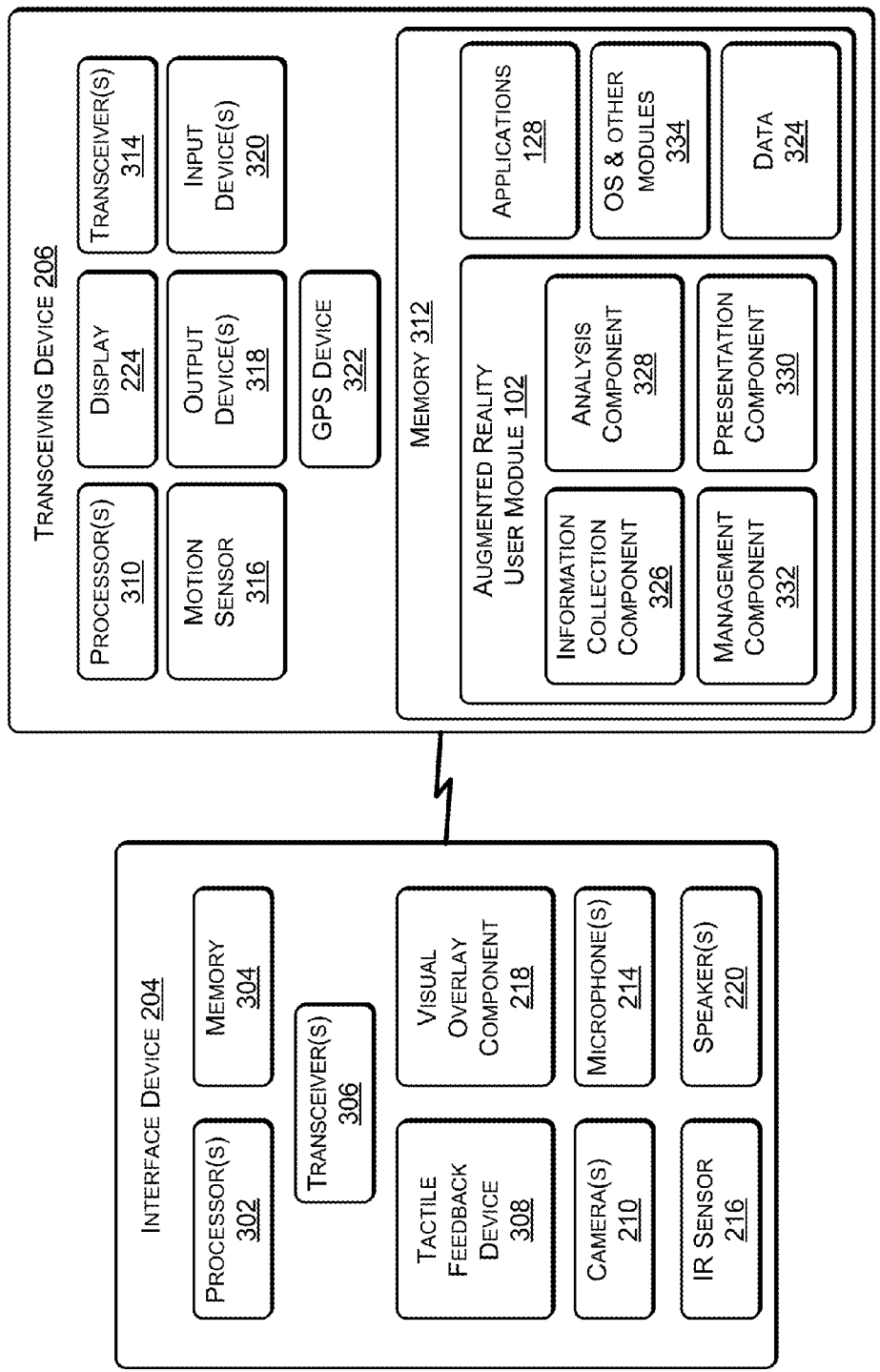
FIG. 3 is a block diagram illustrating selected details of the portable apparatus according to some implementations.

FIG. 3 is a block diagram illustrating additional select details of the portable apparatus 202 of FIG. 2 according to some implementations. In the illustrated example, interface device 204 includes one or more processors 302, the memory 304, and or more transceivers 306. For example, processors 302 may be used to control and manage the sensing and output components contained in interface device 204, such as cameras 210, microphones 214, IR sensor 216, visual overlay component 218, and speakers 220. Memory 304 may be used to buffer collected camera and sensor information prior to transmission to the transceiving device 206, while also buffering information to be displayed by visual overlay component 218 or to be played on speakers 220. Furthermore, in some implementations a tactile feedback device 308 may be included with the interface device 204 such as a vibration device or other device suitable for providing tactile feedback to the user wherein the interface device 204.

Transceiving device 206 may include one or more processors 310, a memory 312, one or more transceivers 314, a motion sensor 316, various output devices 318 (in addition to display 224), various input devices 320, and a GPS device 322. Processors 310, 302 may be a single processing unit or a number of processing units, all of which may include single or multiple computing units or multiple cores. For example, among other capabilities, the processors 310, 302 can be configured to fetch and execute computer-readable instructions or processor-accessible instructions stored in the memories 312, 302, or other computer storage media.

Depending on the configuration of portable apparatus 202, the memories 320, 304 (and other memories described throughout this document) are examples of computer storage media and may include volatile and nonvolatile memory. Thus, the memories 320, 304 may include, but are not limited to, RAM, ROM, EEPROM, flash memory, or other memory technology and devices, or any other medium, such as hard disk drives, which can be used to store information, applications, modules, components and data for carrying out the functions described herein. For example, memory 312 may be used to store any number of functional components and modules that are executable on the processor(s) 310, 302 as well as data 324 received or used by the portable apparatus 202.

In the illustrated example, memory 312 may include AR user module 102, which may be executed on processor(s) 310 to perform at least some of the functions described herein. AR user module 102 may include various executable components for carrying out various functions. For instance, AR user module 102 may include an information collection component 326 for managing the collection and storage of information by the interface device 204, as well as information obtained through transceiver(s) 314. Additionally, AR user module 102 include an analysis component 328 for analyzing the collected information, implementing the assistance of any applications 128 to obtain application-provided information, and determining appropriate augmented reality information to be displayed to the user through the interface device 204, such as based on user preferences and permissions. AR user module 102 may further include a presentation component 330 for managing the presentation of the augmented reality information to the user through the interface device 204. Additionally, AR user module may include a management component 332 that can be employed by the user for managing settings of the AR user module 102, such as for controlling preferences and profile settings, transmitted information, and the like.

Memory 212 may also include an operating system and other modules 334 for carrying out various other functions. For example, in implementations in which transceiving device 206 also serves as a smart phone and/or general-purpose mobile computing device, numerous other functionalities may be provided by transceiving device 206, such as the ability to make phone calls, browse the Internet, listen to music, play games, and the like. Consequently, the portable apparatus 202 may have additional features or functionality not illustrated herein. For example, the portable device 202 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. Typically, the functionality of the program modules may be combined or distributed as desired in various implementations. An implementation of these modules and techniques may be stored on or transmitted across some form of computer readable media.

Architectural Environment

Figure 4:
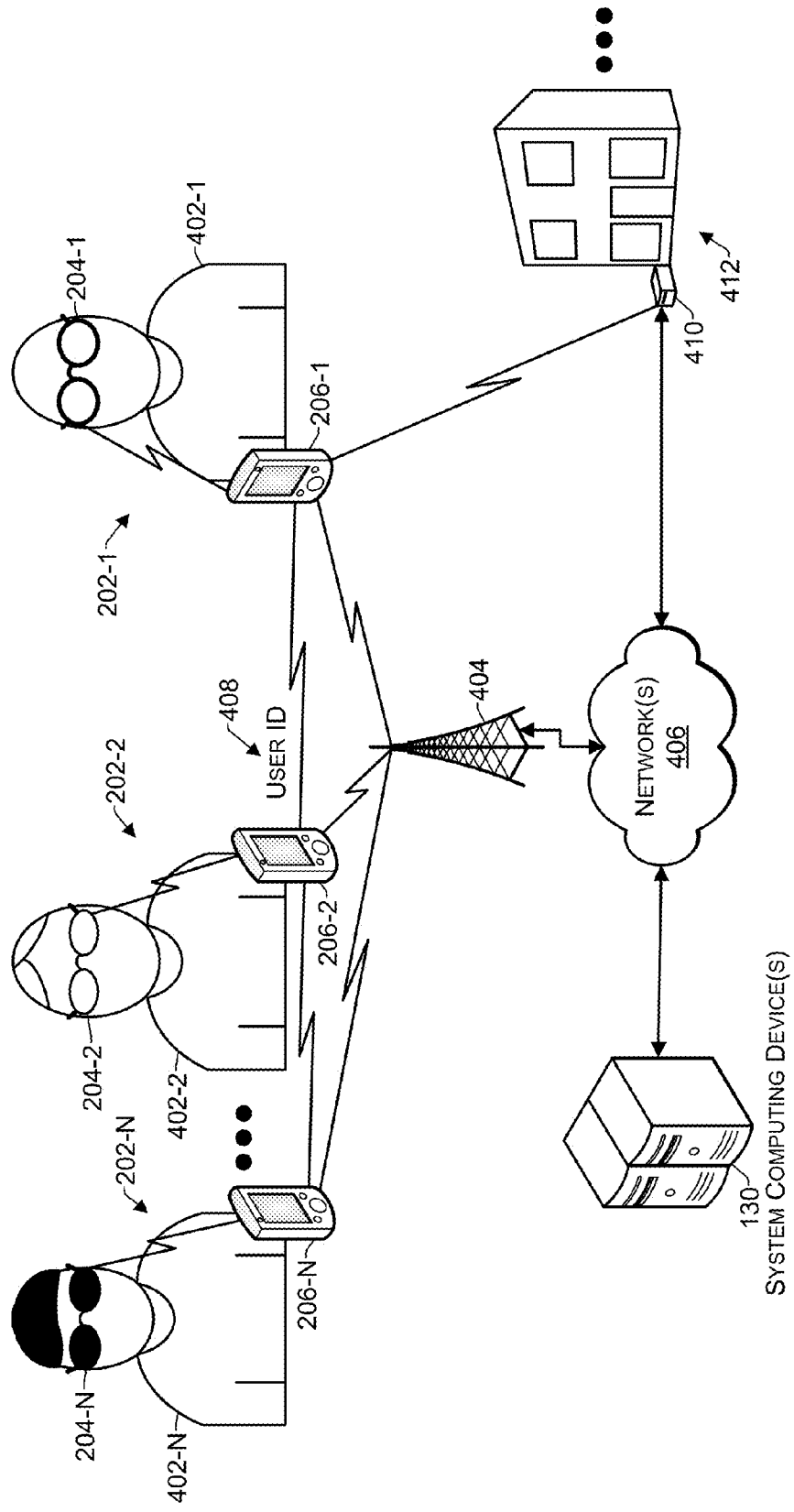
FIG. 4 illustrates a system architecture for providing augmented reality according to some implementations.

FIG. 4 illustrates an example system architecture 400 in which one or more users 402 may operate respective portable apparatuses 202 for providing augmented reality to the users 402. In the illustrated example, a first user 402-1 may use a first portable apparatus 202-1, a second user 402-2 may use a second portable apparatus 202-2, and an Nth user 402-N may use an Nth portable apparatus 202-N, where N is an integer greater than two in this example. Thus, the system 400 is not limited to any particular number of users. Each portable apparatus 202-1, 202-2, ..., 202-N includes a respective interface device 204-1, 204-2, ..., 204-N in operative communication with a respective transceiving device 206-1, 206-2, ..., 206-N. Accordingly, each portable apparatus 202-1, 202-2, ..., 202-N may be employed to implement techniques to provide augmented reality to the respective user 402-1, 402-2, ..., 402-N.

The transceiving devices 206-1, 206-2, ..., 206-N may be configured to communicate with a wireless network 404. One example of suitable wireless technology and associated protocols is the Wireless Fidelity (WiFi) wireless networking technologies defined according to IEEE 802.11 standards, while another example is a wireless telephone or cellular network using any of the various wireless communication protocols, or other suitable wireless technology. The wireless network 404 may provide access to one or more additional network(s) 406. Thus, network(s) 406 may be representative of any one or a combination of multiple different types of networks, such as the Internet, cable networks, cellular networks, wireless networks, and wired networks. Through access to network(s) 406, the transceiving devices 206-1, 206-2, ..., 206-N may communicate with one or more system computing devices 130, as described above, such as for obtaining information regarding a particular user based on a user ID.

When in local proximity to each other, the transceiving devices 206-1, 206-2, ..., 206-N may be configured to wirelessly communicate with each other, such as via Bluetooth®, WiFi, infrared (IR) light, or other wireless communication technologies, or any combination thereof. For example, when first transceiving device 206-1 is brought within range of second transceiving device 206-2, the first transceiving device 206-1 may wirelessly receive a user ID 408 of the second user 402-2 being broadcast by the second transceiving device 206-2. The first transceiving device 206-1 may then transmit the received user ID 408 of the second user over the wireless network 404 and the network(s) 406 to the system computing device(s) 130. The system computing device(s) 130 can check the profile of the second user 402-2 based on the received user ID 408 in comparison with the profile of the first user 402-1. Based on the comparison, the system computing device(s) 130 can determine any commonalities for providing augmented reality information that may be displayed to the first user 402-1 in an overlay adjacent to the second user 402-2 when the first user 402-1 looks at the second user 402-2. Furthermore, in some implementations, the system computing device(s) 130 may automatically push similar information regarding the first user 402-1 to the second user's transceiving device 206-2, rather than waiting for the second user's transceiving device 206-2 to detect and transmit the first user's user ID to the system computing device(s) 130.

In addition, the system 400 may also include one or more fixed transceiving devices 410, such as may be employed by a business 412, government service, or the like. Fixed transceiving device 410 may implement many of the components and functionality of transceiving devices 206 discussed above, but may be directly connected to network(s) 406, rather than using a wireless connection. Further, it should be noted that fixed transceiving device 410 is not to scale in FIG. 4, and typically might be maintained inside the business 412 rather than on the exterior. Fixed transceiving device 410 may broadcast information that can be received by transceiving devices 206. Accordingly, in the case in which business 412 is a restaurant, the menu of the restaurant may be transmitted directly to any transceiving devices 206 within transmission range of the fixed transceiving device 410. Furthermore, fixed transceiving device 410 may also transmit a user ID that can be received by a transceiving device 206 and submitted to the system computing device(s) 130. This enables the display of customized information based on the profile of the user of the transceiving device 206.

For example, suppose business 412 is a restaurant and first user 402-1 is walking by the business 412. The transceiving device 206-1 of the first user may detect the user ID of the business 412, and transmit the user ID to the system computing device(s) 130. The system computing device(s) 130 may compare the profile of the first user 402-1 with the profile of the business 412 and detect that the first user is a vegetarian and that the business 412 offers a vegetarian menu. Consequently, the system computing device(s) 130 may provide the vegetarian menu to the transceiving device 206-1 rather than the general menu of the business 412.

In another variation, rather than just transmitting the general menu of the business 412, the fixed transceiving device 410 may transmit both the general menu and the vegetarian menu directly to the transceiving device 206-1. The transceiving device 206-1 may filter the information received from the fixed transceiving device 410 based on the profile or preferences of the first user 402-1 so as to display just the vegetarian menu of the business 412 when the user looks in the direction of the business 412.

Example System Computing Device

Figure 5:
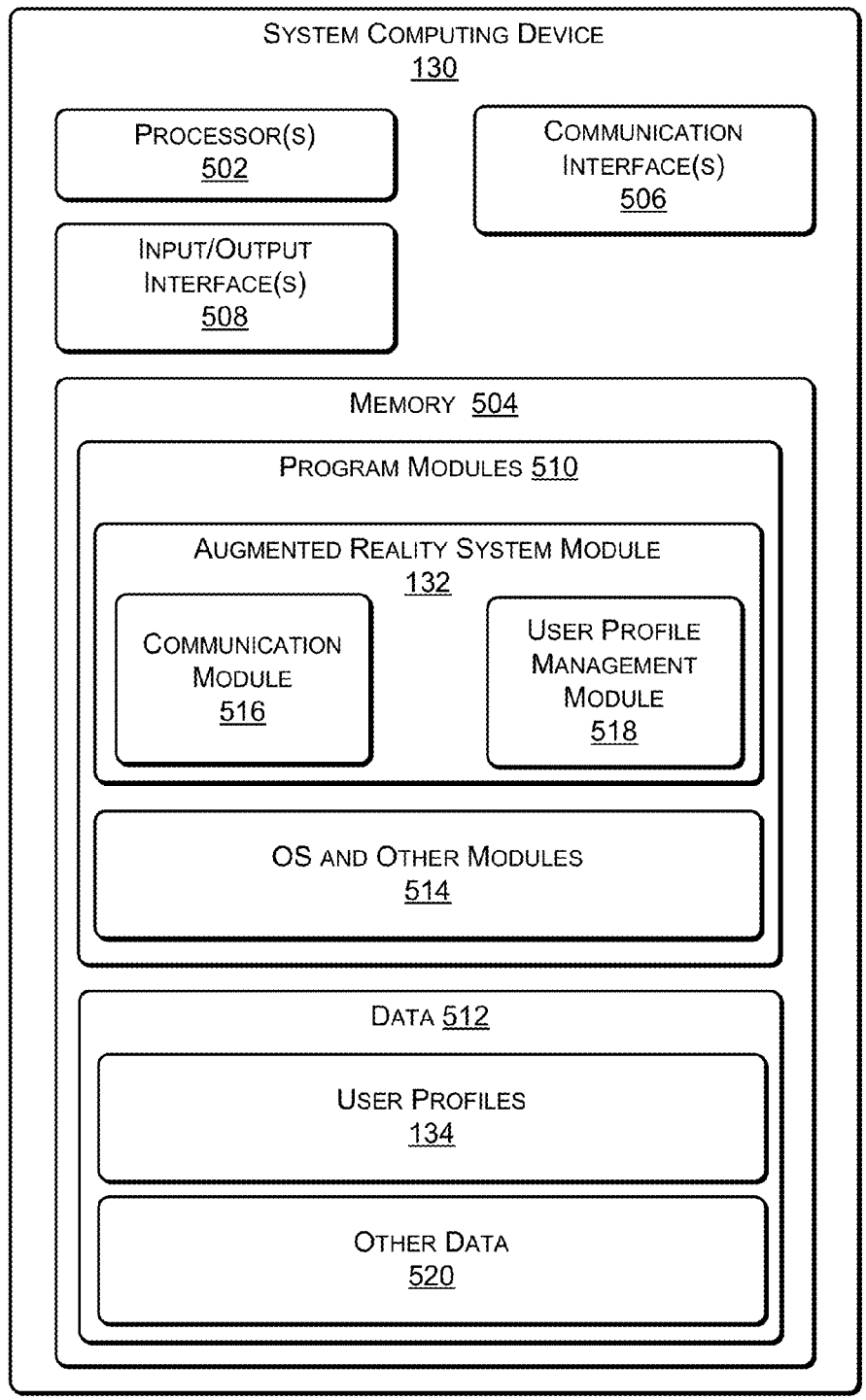
FIG. 5 is a block diagram illustrating selected details of a system computing device according to some implementations.

FIG. 5 is a block diagram illustrating an example configuration of a suitable computing system environment for system computing device 130 according to some implementations. System computing device 130 may include at least one processor 502, a memory 504, communication interfaces 506 and input/output interfaces 508.

The processor 502 may be a single processing unit or a number of processing units, all of which may include single or multiple computing units or multiple cores. The processor 502 can be implemented as one or more microprocessors, microcomputers, microcontrollers, digital signal processors, central processing units, state machines, logic circuitries, and/or any devices that manipulate signals based on operational instructions. Among other capabilities, the processor 502 can be configured to fetch and execute instructions stored in the memory 504 or other computer storage media.

Memory 504 is an example of computer storage media for storing instructions which are executed by the processor 502 to perform the various functions described above. For example, memory 504 may generally include both volatile memory and non-volatile memory (e.g., RAM, ROM, or the like). Further, memory 504 may also include mass storage devices, such as hard disk drives, solid-state drives, removable media, including external and removable drives, memory cards, Flash memory, floppy disks, optical disks (e.g., CD, DVD), storage arrays, storage area networks, network attached storage, or the like, or any combination thereof. Memory 504 is capable of storing computer-readable, processor-executable program instructions as computer program code that can be executed on the processor 502 as a particular machine configured for carrying out the operations and functions described in the implementations herein.

Memory 504 may include program modules 510 and data 512. Program modules 510 may include the AR system module 132 and other modules 514, such as an operating system, drivers, and the like. AR system module 132 may include a communication module 516 and a user profile management module 518, which can be executed on the processor 502 for implementing the functions described herein. In some implementations, communication module 516 receives user IDs from transceiving devices 206, retrieves the corresponding user profiles and determines augmented reality information to be provided based on the user profiles. Additionally, user profile management module may enable users to create and store user profiles and corresponding user information at the system computing device 130.

Additionally, data 512 may include the user profiles 134 created by the users of the augmented reality system. For example, user profiles 134 may include user information, preference information, permission information, and the like, to be used by the communication module 516 when determining information to provide to the user and to other users. Data 512 may also include other data 516, such as for use in server operations, and so forth.

The system computing device 130 can also include one or more communication interfaces 506 for exchanging data with other devices, such as via network 406, as discussed above. The communication interfaces 506 can facilitate communications within a wide variety of networks and protocol types, including wired networks (e.g., LAN, cable, etc.), the Internet, wireless networks (e.g., WLAN, cellular, satellite, etc.), and the like. The system computing device may further be equipped with various input/output (I/O) interfaces 508, such as connection ports, and the like, for connecting to various components, such components may include a display, a keyboard, a mouse, audio speakers, connection ports, and so forth.

Example Environment of Use

Figure 6:
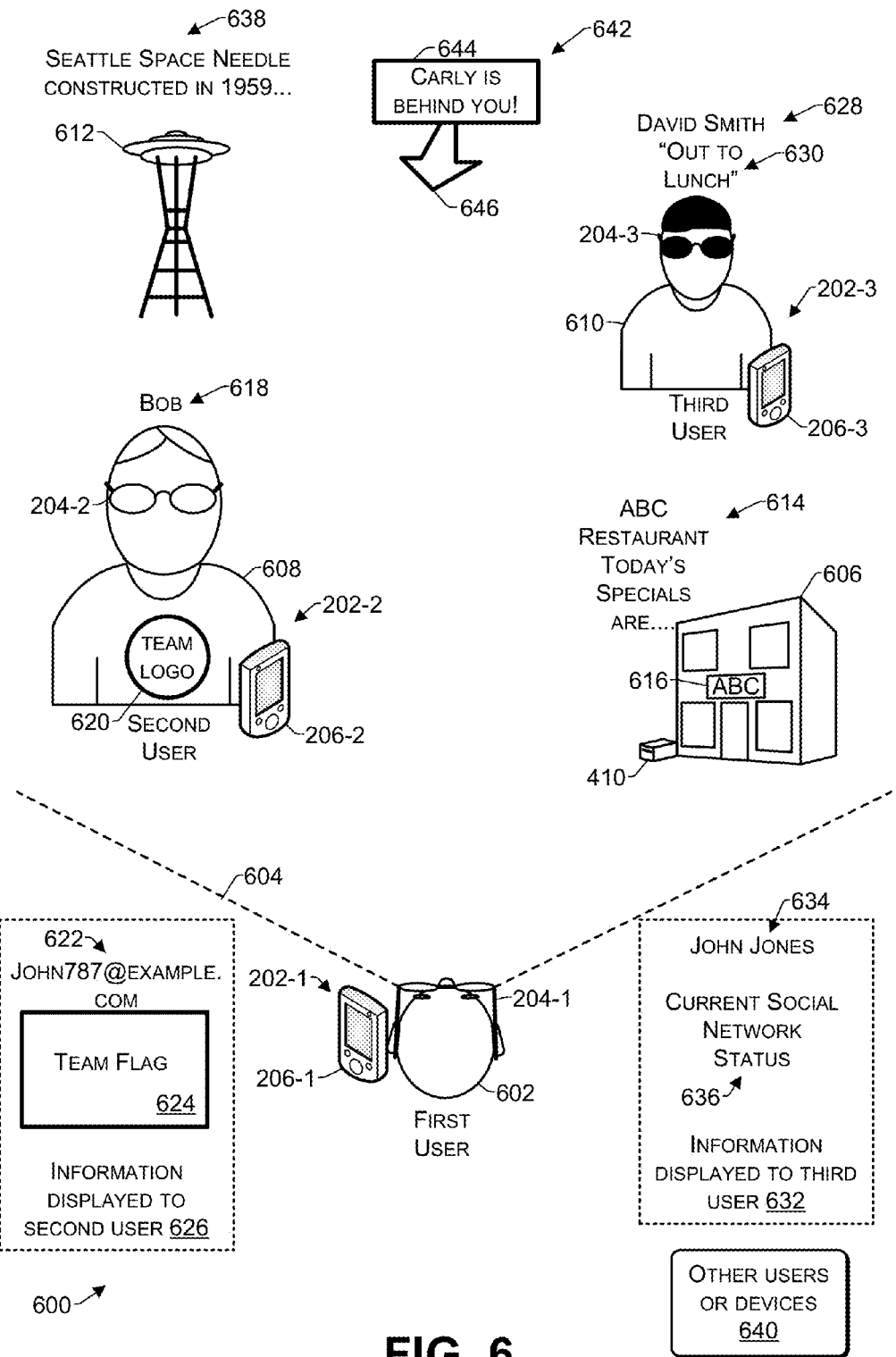
FIG. 6 illustrates an example for discussion purposes of an environment of use of the augmented reality framework, apparatus, system and techniques herein according to some implementations.

FIG. 6 illustrates an example environment 600 for discussion purposes according to some implementations. In this example, suppose a first user 602, named John Jones, uses a first portable apparatus 202-1, including a first interface device 204-1 and a first transceiving device 206-1. First user 602 may be walking down a street and may have at least four objects within his field of view 604, namely, a restaurant 606, a second user 608, a third user 610, and a famous landmark 612 (e.g., the Seattle Space Needle). The restaurant 606 may include a fixed transceiving device 410. The second user 608 may be using a second portable device 202-2 including a second interface device 204-2 and a second transceiving device 206-2. The third user 610 may be using a third portable device 202-3 including a third interface device 204-3 and a third transceiving device 206-3. In this example, the landmark 612 does not have a transceiving device 410 associated with it.

The first transceiving device 206-1 of the first user 602 may receive one or more transmissions from devices 206-2, 206-3, 410 within the field of view 604, such as user IDs and/or transmitted information, as described above. Furthermore, first transceiving device 206-1 of the first user 602 may also broadcast a first user ID of the first user 602, which may be detected by the devices 206-2, 206-3, 410. As described above, received user IDs may be submitted to a remote system computing device 130 (not shown in FIG. 6) and used to determine a suitable information and imagery to be displayed in association with each of the objects in the field of view 604. For instance, the transceiving device 410 of the restaurant 606 may transmit information directly to the first transceiving device 206-1 of the first user 602, or may transmit a user ID, as described above. The transmitted information may include the name of the restaurant and the specials of the day. Further in the case of a transmitted user ID, the first portable device may submit the user ID of the restaurant to the system computing device 130 to obtain information regarding the restaurant 606.

As the first user 602 glances to his right, he may see the restaurant 606. The first interface device 204-1 may display information 614 about the restaurant 606 based on the transmitted information received from the transceiving device 410 and/or information received from the system computing device 130. For example, the information 614 may be displayed adjacent to the restaurant as an augmented reality overlay, and may provide the name of the restaurant, the daily specials, reviews, and/or other information. Furthermore, because the first user is currently receiving multiple signals from multiple sources, portable apparatus 202-1 may use recognition technology, signal strength detection, GPS data, or the like to determine when the user is looking at the particular restaurant 606 corresponding to the information 614, so that the appropriate information 614 may be displayed adjacent to the restaurant 606 as the visual overlay. For example, the restaurant 606 may include a sign 616 displaying the name of the restaurant 606. A text recognition application on the portable device 202-1 may recognize the letters comprising the name of the restaurant 606 on the sign 616 for associating the restaurant 606 with the information 614 about the restaurant to be displayed in the visual overlay.

Next, suppose that the first user 602 glances to his left and looks at the second user 608. The first user 602 may not know the second user 608, but they both may be fans of the same sports team and this information may be included in their user profiles maintained by the system computing device 130. Furthermore, they may have each set permissions and preferences in their user profiles whereby their team allegiance is displayed to fellow fans. Consequently, when the first user 602 looks at the second user 608, a visual overlay is displayed to the first user in association with the second user 608. For example, the visual overlay may include the first name 618 of the second user (e.g., "Bob") and may also include the team logo 620 of the sports team. For instance, the second user may have specified that the team logo 620 be displayed across his chest to other fans of the sports team. On the other hand, the first user 602 may have specified that his email address 622 (e.g., "John787@example.com") be displayed to other fans of the sports team, and that an animated version of the team flag 624 be displayed waving over his head. Consequently, the email address 622 and team flag 624 are information 626 displayed as a visual overlay to the second user 608 when the second user 608 looks at the first user 602.

Next, suppose the first user 602 looks at the third user 610. Further, suppose that the third user 610 is a social network friend of the first user 602. In this situation, the user profiles of the first user 602 and the third user 610 may contain a different set of permissions and preferences than for the second user 608. For example, when the first user 602 looks at the third user 610, the first user 602 may be presented with a visual overlay that displays the third user's full name 628 (e.g., "David Smith") and a current social network status 630 (e.g., "out to lunch") of the third user 610. Similarly, the third user 610 may be presented with information 632 displayed to the third user, that is different than the information 626 displayed to the second user, such as the first user's full name 634 (e.g., "John Jones") and current social network status 636.

Furthermore, because the first portable apparatus 202-1 may be receiving contemporaneous signals from both the second user 608 and the third user 610, the first portable apparatus 202-1 can determine from other factors which information is to be displayed in a visual overlay in association with which user. For instance, as discussed above, first portable apparatus 202-1 may use various other inputs such as relative signal strength, facial recognition, IR signals, GPS location information, and the like, for matching the augmented reality information to be displayed in the vicinity of the correct person.

Finally, suppose that the user looks at the landmark 612. The image of the landmark 612 is received by the cameras 210 (not show in FIG. 6) of the first portable apparatus 202-1 when the first user looks at the landmark 612. For instance, one of the active applications 128 on the first portable apparatus 202-1 may be a landmark-identification application in which images obtained by the cameras 210 of the first portable apparatus 202-1 are automatically compared with images of famous landmarks. Furthermore, the first portable apparatus 202-1 can determine from GPS information the location of the first user 602 thereby reducing the number of possible matches. Consequently, when the first user looks at the landmark 612, the landmark identification application may identify the landmark 612 as the Seattle Space Needle, and obtain information about the Seattle Space Needle to be displayed in a visual overlay 638 adjacent to the landmark 612 when the first user 602 looks at the landmark 612.

Further, the information in the visual overlay presented to a user is not limited to displaying information related to objects within the user's field of view. As an example, in FIG. 6, there may be numerous other fixed transceiving devices 410 or users having portable apparatuses 202 within the vicinity of the first user 602, but not within the first user's current field of view 604. For example, one or more other users or devices 640 may be located behind the first user 602, around a corner, inside a nearby building, or may otherwise be near enough to the first portable apparatus 202-1 of the first user 602 to enable receipt of transmissions of information or user IDs. The first portable apparatus 202-1 of the first user 602 may receive transmissions, or may otherwise detect such other users or devices 640 and provide a notification or other indication to the first user 602 as part of a visual overlay 642 provided to the first user 602. For example, if the first portable apparatus 202-1 determines that a friend of the first user 602 is located behind the first user, the visual overlay 642 may display a message 644 such as "Carly is behind you!" with an arrow 646 pointing in the direction of the friend, object, or the like.

Similarly, other information might also be displayed in the visual overlay present to a user, such a notifications, emails, text messages, image or video messages, an incoming telephone call, the receipt of a voicemail, or the like. For example, a portion of the visual overlay, such as a lower corner of the visual overlay might be reserved for displaying messages, notifications, and the like. Additionally, in some implementations in which the portable apparatus 202 also serves as a telephone device, a user may conduct a video call in which an image of the other party to the call may be displayed in the visual overlay. For example, during the video call, the image of the other party may be displayed as being in front of the user, so that the conversation with the other party appears to the user to be taking place in person in the current real-world environment of the user.

Numerous other examples and applications for the augmented reality framework and techniques described herein will be apparent to those of skill in the art in view of the disclosure herein. Several additional non-limiting examples will be described next. As one example, at a business conference, a first user may set her portable apparatus 202 to broadcast her name and the name of her company to all other users at the business conference. Further, the portable apparatuses 202 of the other users at the conference may obtain additional information to be displayed adjacent to the first user based on the first user's user ID. For example, the first user may specify that her college name and year of graduation be displayed to any other users at the conference who went to the same college. This information can be easily determined by the system computing device 130 through comparison of user profiles. Alternatively, the first user might transmit her college information directly to the other users along with instructions to the portable apparatuses 202 of the other users to only display the college information if the users of the other portable apparatuses 202 went to the same college.

As another example, a comparison-shopping application may be one of the applications 128 active on the portable apparatus 202 of a user. When the user is shopping in a store, the comparison-shopping application may use images received from the cameras 210 of the portable apparatus 202 to recognize and scan barcodes of items that the user looks at in the store. The comparison-shopping application can perform various functions by identifying the items from the barcodes. For example, the comparison-shopping application may obtain online reviews of an item while the user is looking at the item. The review information may be displayed in real-time as a visual overlay adjacent to the item in the user's field of view. As another function, the comparison-shopping application may access various online comparison-shopping tools and display other prices for the item available at various websites and/or other retail stores. As one example, the comparison-shopping application may be provided as a free application by a particular online retailer and may be configured to provide the prices and reviews available from the particular online retailer's website for each item perused by the user. Thus, through the comparison-shopping application, the user may be automatically provided with competitive pricing and/or additional information on a product in real-time as the user is simply looking at items in the store.

As another example, the portable apparatus 202 may include an exercise application as one of the applications 128 to enable the portable apparatus to be used as an exercise apparatus such as for jogging, bicycling or the like. For example, the portable apparatus 202 may display a visual overlay of a jogger running ahead of the user at a predetermined pace along the same path on which the user is currently jogging. The portable apparatus 202 may use GPS data 118 and other information for determining the user's current pace and may cause the image of the virtual jogger overlaid on the path to vary based upon the pace of the user. For example, if the image of the virtual jogger is set to run at a pace of 8 mph, and the user is only running at 7 mph, the image of the virtual jogger presented in the visual overlay may appear to pull away from the user to provide motivation to the user to increase his or her pace. Additionally, if a user typically runs along the same route, the exercise application may include a learning capability to recognize the path along which the user runs and various landmarks at the locations where the user usually makes turns. The exercise application can then use a recognition function to recognize the path and the locations where the user usually makes a turn, and cause the virtual jogger to appear to run along the recognized path and make turns at the recognized locations at which the user usually makes a turn. A similar function may be provided for bicycling, downhill skiing, or other such activities.

As another example, the portable apparatus may include a game application or other application to display virtual figures in a field of view of the user. For example, a game may display one or more virtual people displayed so as to appear to be present in the real-world environment of the user and able to interact with one or more real-world objects, such as the ground, sidewalks, stairs, buildings, trees, etc. In a combat game example, a game application running on the portable apparatus may recognize an object, such as a doorway or window in the user's field of view. For example, the game application may display a visual overlay to cause a virtual person to appear to be peering around an edge of the door or window as part of the game. Numerous other gaming applications are contemplated based on the ability of implementations described herein to recognize one or more objects in the user's real-world field of view and display virtual figures overlaid in an appropriate manner so as to appear to be interacting with the real-world environment in a realistic manner.

As another example, rather than merely displaying information in the vicinity of a user, the some implementations may alter the appearance of the user. For example, a user may specify that he or she appear in a certain way to one or more category of users. For example, a first user may transmit a signal that is received by a second user that specifies that the first user is to appear to be clothed in a particular outfit, appear to have an altered appearance, such as having snakeskin, appear to look like a particular movie star, or the like. Thus, one of applications 128 on the second user's portable apparatus 202 may generate the appearance effect and overlay the appearance effect on the real-world view of the first user. For instance, the second user's portable apparatus may correctly position the appearance effect in real time based on images received from the cameras of the second user's portable apparatus. The instruction to perform the appearance effect may be either directly transmitted from the first user's portable apparatus to the second user's portable apparatus, or may be part of the first user's profile for one or more categories of user's. Should a particular user not have the appearance effect application installed, the particular user might be prompted to download and install the application on his or her portable apparatus 202. This prompting to obtain an application can be performed for any application 128 that might enhance a user's experience when the system notes that a particular user cannot utilize some information of other users.

Further, some implementations may have military applications. For example, the infrared detectors 216 may be of high sensitivity for providing night vision-type capabilities to a user. Furthermore, one of the applications 128 may examine the camera data received from cameras 210 for identifying any minor movements in distant windows to provide warning to a user of the possibility that a sniper may be present in one of the windows. Additionally, another one of applications 128 may be configured to positively identify "friendlies" in a battlefield environment, such as by painting members of the same side red in the visual overlay. Various combinations of image recognition technology and transmission-detection technology in the manner described above can be used to positively identify the friendlies to a user.

Example Process

Figure 7:
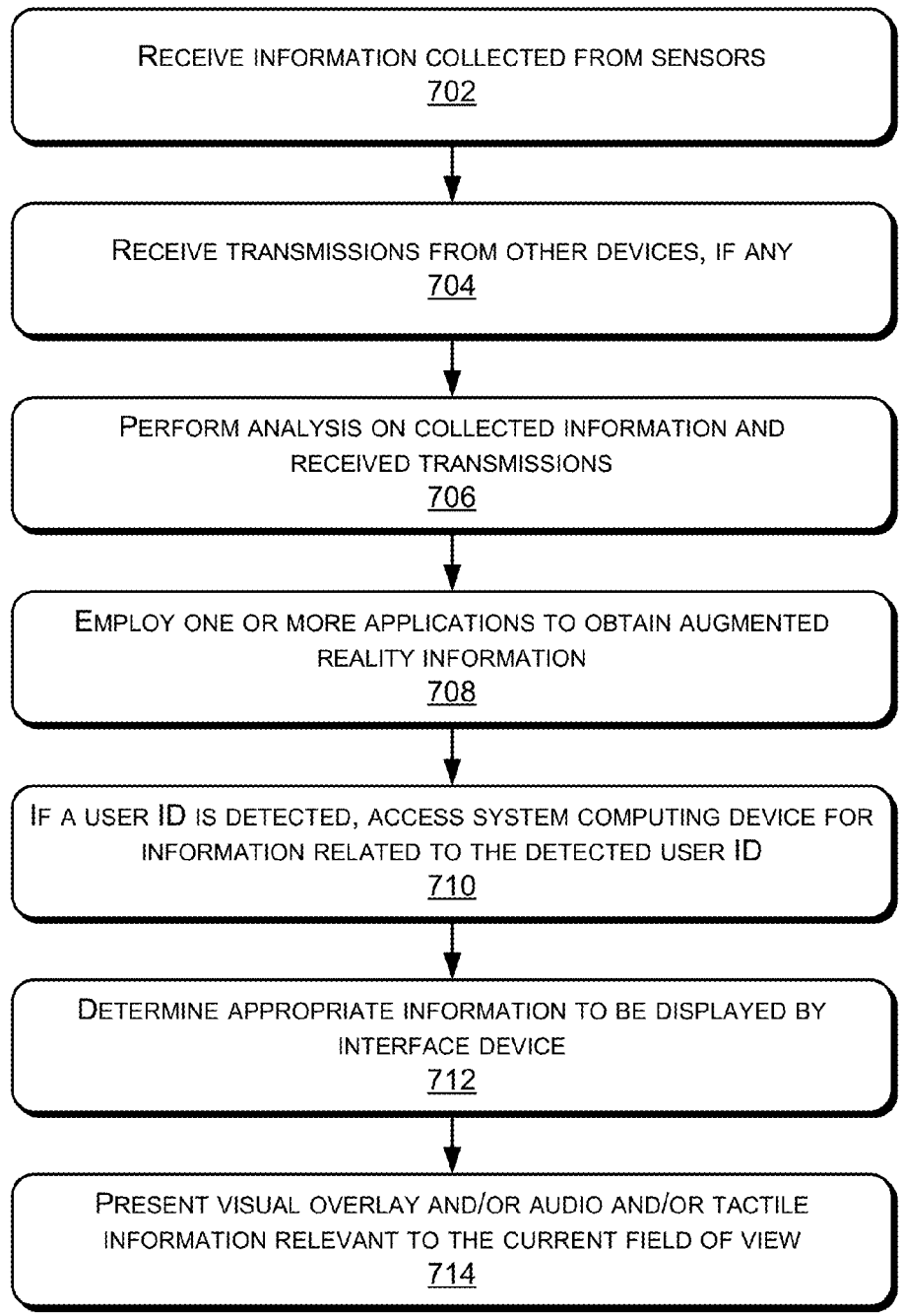
FIG. 7 is a flow diagram showing a process of providing augmented reality according to some implementations.

FIG. 7 illustrates an example process 700 for implementing the techniques described above for providing augmented reality to a user according to some implementations. This process is illustrated as a logical flow diagram, each block of which represents one or more operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the blocks are described is not intended to be construed as a limitation, and any number of the described operations can be combined in any order and/or in parallel to implement the process. For discussion purposes, the process 700 is described with reference to the framework, apparatus, system and environment of FIGS. 1-6, although other frameworks, apparatuses, systems and environments may implement this process.

At block 702, the portable apparatus receives data from the sensing components. For example, an information collection component may receive camera image data, microphone data, IR sensor data, motion sensor data, GPS data, and the like.

At block 704, the portable apparatus may receive transmissions from other apparatuses or devices, if any transmissions are provided. For example, information collection component may receive wireless transmissions from other portable apparatuses of other users or from fixed transceiving devices, such as for receiving user IDs, transmitted information, or the like.

At block 706, the portable apparatus performs analysis on the collected information and any received transmissions. For example, an analysis component may use the received information for determining various types of augmented reality information to present to the user.

At block 708, as part of the analysis the portable apparatus may employ one or more applications to obtain augmented reality information relevant to the current field of view of the user. For example, the portable apparatus may utilize shape recognition or facial recognition applications, such as for recognizing a person or other object, text recognition applications, such as for recognizing a name on a sign, and numerous other types of applications for performing various functions, additional examples of which are discussed herein.

At block 710, if one or more user IDs have been detected, the portable apparatus may submit the detected user ID to a system computing device for obtaining information related to the detected user ID. For example, the system computing device may locate a user profile corresponding to the submitted user ID and may perform a matching function between the located user profile and the profile of the user that submitted the detected user ID. Based on this comparison, the system computing device provides information to the user to be displayed as an overlay in the vicinity of the person for whom the user ID was detected.

At block 712, the portable device determines appropriate information to provide to the interface device. For example, the analysis component may perform a filtering process based on at least one of user preferences, user profile, current time, a current location, or a current context of the user. For example, if the user receives transmitted information from a fixed transceiving device, such as a store or restaurant, the information presented to the user may be filtered based on user preferences so that only information that is of interest to the user is displayed.

At block 714, the portable device presents a visual overlay and/or other information, such as audio or tactile information, relevant to the current field of view to the user. For example, the user may be wearing a head-mounted interface device which enables an augmented reality visual overlay to be presented to the user in the user's field of view for providing information and/or computer-generated imagery relevant to one or more objects in the field of view. Furthermore, the process 700 may be a continuous ongoing process, as information is constantly being received by the portable apparatus and presented as an overlay to the user.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. An apparatus comprising:
a transceiver configured to transmit and receive data;
a processor;
a memory communicatively coupled to the processor;
a module maintained in the memory and executed on the processor to:
  receive a transmission related to an object in a vicinity of the apparatus, the transmission comprising an identifier (ID) corresponding to the object, wherein the object represents a different user, determine specific information related to the object based, at least in part, on the transmission,
  transmit at least part of the specific information and the ID to a remote computing device to request the remote computing device to:
    determine an identity of the object that represents the different user,
    identify an outbound permission rule of the different user based on the ID, and
    determine a permission rule determined based, at least in part, on finding a commonality between the outbound permission rule of the different user and an inbound permission rule of the user, and
  receive additional information related to the object from the remote computing device based, at least in part, on the permission rule; and
a transparent or semi-transparent interface interposed between a user of the apparatus and the object, the interface comprising:
  a visual overlay component to display, as a visual overlay on the interface, the specific information and the additional information related to the object while the object is at least partially within a real-world field of view of the user.

2. The apparatus as recited in claim 1, further comprising at least one camera for capturing images of the real-world field of view of the user, wherein:
the module recognizes the object based, at least in part, on the images; and the module employs the images, at least in part, when determining placement of the specific information and additional information related to the object in the visual overlay.

3. The apparatus as recited in claim 1, further comprising one or more speakers for providing audio information relevant to the object to the user.

4. The apparatus as recited in claim 1, further comprising a tactile feedback device for providing tactile information relevant to the object to the user.

5. The portable apparatus as recited in claim 1, further comprising displaying at least one virtual figure in the visual overlay appearing to be in the field of view of the user.

6. The portable apparatus as recited in claim 5, wherein the virtual figure is displayed so as to appear to interact with the object in the field of view.

7. The portable apparatus as recited in claim 5, wherein:
the object comprises a predetermined path upon which the user is traveling; and
the virtual figure comprises a virtual person displayed as the visual overlay to appear to be traveling on the predetermined path ahead of the user.

8. The apparatus as recited in claim 1, wherein a signal related to the object is received from a portable device that is physically detached from the apparatus and wirelessly communicating with the apparatus.

9. A method comprising:
receiving, at a portable device of a first user, information related to an object associated with a second user;
recognizing, by using one or more processors, the object from among multiple objects in a field of view for associating the information with the object;
determining a display permission rule based, at least in part, on finding a commonality between an outbound permission rule of the second user and an inbound permission rule of the first user; and
displaying, in a vicinity of the object on an interface of the portable device, a portion of the information associated with the second user, in response to the displaying of the portion being permitted by the display permission rule, as a visual overlay in the field of view of the first user.

10. The method as recited in claim 9, further comprising:
detecting an identifier (ID) transmitted for identifying the object; and
providing the ID to a remote computing device to receive the information related to the object.

11. The method as recited in claim 10, wherein:
the displaying the information as a visual overlay is in the field of view of the first user;
the identifier (ID) of the object identifies the second user using another portable device for transmitting the identifier;
the identifier enables the remote computing device to locate a user profile of the second user; and
the user profile of the second user is compared with a user profile of the first user for determining, at least in part, the information related to the second user to be displayed to the first user in the visual overlay.

12. The method as recited in claim 11, wherein the user profile of the second user specifies that different information related to the second user be displayed depending on whether the user profile of the first user matches one or more categories of users.

13. The method as recited in claim 9, wherein the object is a person and displaying the information in the vicinity of the object as a visual overlay in the field of view further comprises changing an appearance of the person by at least one of:
changing the appearance of skin of the person;
changing the appearance of clothing of the person; or
change the appearance of a face of the person.

14. The method as recited in claim 9, wherein the recognizing the object from among multiple objects in the field of view further comprises using at least one of: shape recognition; facial recognition; measured radio frequency signal strength or direction; infrared light reception characteristics; or Global Positioning System information.

15. The method as recited in claim 9, wherein:
the receiving information related to the object in the field of view further comprises receiving the information from an application that examines image data captured from the field of view and carries out a recognition function to recognize the object from among the multiple objects; and
the application provides the information based, at least in part, on recognizing the object.

16. The method as recited in claim 15, wherein:
the application obtains an image of the object from a remote computing device based, at least in part, on an identifier corresponding to the object received by a wireless transmission; and
the recognition function includes a comparison of the image of the object obtained from the remote computing device with the image data captured from the field of view.

17. The method as recited in claim 9, wherein the receiving information related to the object in the field of view further comprises receiving an advertisement for one or more products to be displayed as a visual overlay in the field of view of the first user, the advertisement being specified by a user profile set by the second user in exchange for compensation when the advertisement is displayed in the vicinity to the object associated with the second user.

18. The method as recited in claim 17, further comprising filtering the advertisement based, at least in part, on the display permission rule; and displaying the filtered advertisement in the vicinity of the object as a visual overlay.

19. A method comprising:
receiving a transmission of specific information related to an object in a vicinity of the user but not currently in the field of view of the user at a portable apparatus carried by a user, wherein the specific information is provided by another user in a vicinity of the user;
determining a display permission rule based, at least in part, on finding a commonality between an outbound permission rule of the other user and an inbound permission rule of the user;
displaying a visual overlay related to the specific information on an interface interposed between the user and a real-world field of view of the user in response to the displaying the visual overlay of the specific information being permitted by the display permission rule; and
providing alert information associated with the object in response to a detected condition, wherein the alert information comprises at least one of: a sound, a visual signal, a vibration, or a message for a Braille device, wherein at least one of the visual overlay or the alert information indicates a direction for the user to look to bring the object within the field of view of the user.

20. The method as recited in claim 19, further comprising: determining an advertisement for one or more products to be displayed to the user based at least in part on the specific information, the other user being compensated for providing the advertisement displayed adjacent to the other user on an interface of the user.

21. The method as recited in claim 20, wherein the determining the advertisement is based, at least in part, on finding the commonality between an outbound permission rule of the other user and an inbound permission rule of the user.

22. The method as recited in claim 19, wherein:
the object is a person located behind the user; and
the visual overlay or the alert information provides a notification that the person is behind the user.

23. The method as recited in claim 19, wherein the information comprises at least one of:
an email;
a text message;
a video message;
notification of a message or voicemail;
notification of a telephone call; or
a video call.

24. A system comprising:
at least one computing device configured to implement one or more services, wherein the one or more services are configured to:
receive, at a portable device of a first user, information related to an object associated with a second user;
recognize the object from among multiple objects in a field of view for associating the information with the object;
determine a display permission rule based, at least in part, on finding a commonality between an outbound permission rule of the second user and an inbound permission rule of the first user; and
display, in a vicinity of the object on an interface of the portable device, a portion of the information associated with the second user, in response to the displaying of the portion being permitted by the display permission rule, as a visual overlay in the field of view of the first user.

25. The system as recited in claim 24, wherein the one or more services are further configured to:
detect an identifier (ID) transmitted for identifying the object; and
provide the ID to a remote computing device to receive the information related to the object.

26. The system as recited in claim 25, wherein:
the display of the information as a visual overlay is in the field of view of the first user;
the identifier (ID) of the object identifies the second user-using another portable device for transmitting the identifier;
the identifier enables the remote computing device to locate a user profile of the second user; and
the user profile of the second user is compared with a user profile of the first user for determining, at least in part, the information related to the second user to be displayed to the first user in the visual overlay.

27. The system as recited in claim 26, wherein the user profile of the second user specifies that different information related to the second user be displayed depending on whether the user profile of the first user matches one or more categories of users.

28. The system as recited in claim 24, wherein the object is a person and displaying the information in the vicinity of the object as a visual overlay in the field of view further comprises changing an appearance of the person by at least one of:
changing the appearance of skin of the person;
changing the appearance of clothing of the person; or
change the appearance of a face of the person.

29. The system as recited in claim 24, wherein the recognizing the object from among multiple objects in the field of view further comprises using at least one of: shape recognition; facial recognition; measured radio frequency signal strength or direction; infrared light reception characteristics; or Global Positioning System information.

30. The system as recited in claim 24, wherein:
the receiving information related to the object in the field of view further comprises receiving the information from an application that examines image data captured from the field of view and carries out a recognition function to recognize the object from among the multiple objects; and
the application provides the information based, at least in part, on recognizing the object.

31. The system as recited in claim 24, wherein the receiving information related to the object in the field of view further comprises receiving an advertisement for one or more products to be displayed as a visual overlay in the field of view of the first user, the advertisement being specified by a user profile set by the second user in exchange for compensation when the advertisement is displayed in the vicinity to the object associated with the second user.

* * * * *